(12) United States Patent
Lerner et al.

(10) Patent No.: US 10,701,560 B1
(45) Date of Patent: Jun. 30, 2020

(54) CLIENT DEVICE AUTHENTICATION USING CONTACTLESS LEGACY MAGNETIC STRIPE DATA

(71) Applicant: Capital One Services, LLC, McLean, VA (US)

(72) Inventors: Evan Lerner, Midlothian, VA (US); Lara Mossler, Farmville, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/590,536

(22) Filed: Oct. 2, 2019

(51) Int. Cl.
*H04W 12/00* (2009.01)
*H04L 9/32* (2006.01)
(Continued)

(52) U.S. Cl.
CPC ........ *H04W 12/06* (2013.01); *G06K 9/00087* (2013.01); *G06K 9/00288* (2013.01); *G06Q 20/32* (2013.01); *G06Q 20/40* (2013.01); *H04B 1/3816* (2013.01); *H04L 9/0866* (2013.01); *H04L 9/0877* (2013.01); *H04L 9/14* (2013.01); *H04L 9/3234* (2013.01); *H04L 63/0853* (2013.01); *H04M 1/0202* (2013.01); *H04W 12/001* (2019.01); *H04W 12/0401* (2019.01); *G06F 3/0488* (2013.01); *G07F 7/08* (2013.01); *H04L 2209/80* (2013.01)

(58) Field of Classification Search
CPC .. G07F 7/08–0853; G06Q 20/40–4014; G06Q 20/409–40975; H04L 63/0853; H04L 9/3234
See application file for complete search history.

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 7/2017
CN 101192295 6/2008
(Continued)

OTHER PUBLICATIONS

"EMV Contactless Specifications for Payment Systems", EMVCo LLC, Book C-6, Kernel 6 Specification, Feb. 2016, 122 pages.
(Continued)

*Primary Examiner* — Daniel B Potratz
(74) *Attorney, Agent, or Firm* — Hunton Andrews Kurth LLP

(57) ABSTRACT

A technique for generating a diversified encryption key for a contactless legacy magnetic stripe card is disclosed. The diversified key can be generated using a master key, a key diversification value and an encryption algorithm. In one example embodiment, the key diversification value can be provided by the user as a fingerprint, numeric code or photo. The user can provide the key diversification value to the card or a cellphone. The card can generate the diversified key using the user provided key diversification value. The card or the cellphone can transmit the user provided diversification value to the server and the server can regenerate the diversified key using the user provided diversification value.

20 Claims, 6 Drawing Sheets

(51) Int. Cl.
  *G06Q 20/40* (2012.01)
  *G06Q 20/32* (2012.01)
  *H04W 12/06* (2009.01)
  *H04W 12/04* (2009.01)
  *H04L 9/08* (2006.01)
  *H04L 9/14* (2006.01)
  *H04B 1/3816* (2015.01)
  *H04M 1/02* (2006.01)
  *G06K 9/00* (2006.01)
  *H04L 29/06* (2006.01)
  *G06F 3/0488* (2013.01)
  *G07F 7/08* (2006.01)

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |

(56) References Cited

U.S. PATENT DOCUMENTS

| | | |
|---|---|---|
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2004/0236819 A1* | 11/2004 | Anati .............. G06F 21/445 709/200 |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |

(56) References Cited

U.S. PATENT DOCUMENTS

| | | |
|---|---|---|
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0239622 A1 | 10/2007 | Routhenstein |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0201264 A1 | 8/2008 | Brown et al. |
| 2008/0207307 A1 | 8/2008 | Cunningham, II et al. |
| 2008/0209543 A1 | 8/2008 | Aaron |
| 2008/0215887 A1 | 9/2008 | Hart et al. |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2009/0287921 A1* | 11/2009 | Zhu .................. H04L 63/0869 713/155 |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0185397 A1 | 7/2012 | Levovitz |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Borne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1* | 8/2013 | Spodak .................. G05B 1/01 340/5.65 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0122340 A1 | 5/2014 | Flitcroft et al. |
| 2014/0138435 A1 | 5/2014 | Khalid |

(56) References Cited

U.S. PATENT DOCUMENTS

| | | |
|---|---|---|
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0324708 A1* | 10/2014 | McCauley ......... G06Q 20/3226 713/183 |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0348015 A1* | 12/2015 | Ren ..................... G06Q 20/3226 705/41 |
| 2015/0371234 A1 | 12/2015 | Huang |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0104154 A1* | 4/2016 | Milov ................. G06Q 20/4012 705/67 |
| 2016/0140545 A1* | 5/2016 | Flurscheim ......... G06Q 20/3821 705/76 |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0286663 A1* | 10/2017 | Hurry ..................... G06F 21/35 |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |

(56) References Cited

FOREIGN PATENT DOCUMENTS

| WO | WO 2017208063 | 12/2017 |
|---|---|---|
| WO | WO 2018063809 | 4/2018 |
| WO | WO 2018137888 | 8/2018 |

OTHER PUBLICATIONS

Notification of Transmittal of the International Search Report and the Written Opinion of the International Searching Authorily issued in PCT/US2019/054312, dated Jan. 2, 2020.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8, 2013.

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 18, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RAYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mauritius Internet [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online]. 2017 [retrieved on Mar. 25, 2019]. Retrieved from Internet URL: https://www.bankrate.com/banking/banking-app-location-sharing/, 6 pages.

(56) References Cited

OTHER PUBLICATIONS

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo (EMV Card Personalization Specification, version 1.0, Jun. 2003, 81 pages).

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Batina, Lejla and Poll, Erik, "SmartCards and RFID," PowerPoint Presentation for IPA Security Course, Digital Security at University of Nijmegen, Netherlands. Retrieved from Internet URL: https://www.cs.ru.nl/E.Poll/teaching/ipa_smartcards.pdf, 75 pages, available on at least Jun. 2, 2019 per Internet Archives, https://web.archive.org/.

Berg, Guy, "Fundamentals of EMV," Smart Card Alliance (retrieved on Mar. 27, 2019). Retrieved from Internet URL: https://www.securetechalliance.org/resources/media/scap13_preconference/02.pdf, 37 pages, available on at least Aug. 30, 2017 per Internet Archives, https://web.archive.org/.

Wikipedia, "ISO/IEC 7813," showing Sep. 23, 2018 last edit date (retrieved on May 28, 2019). Retrieved from Internet URL: https://en.wikipedia.org/wiki/ISO/IEC_7813, 3 pages.

\* cited by examiner

CLIENT DEVICE AUTHENTICATION USING CONTACTLESS LEGACY MAGNETIC STRIPE DATA

BACKGROUND

Data security and transaction integrity are of critical importance to businesses and consumers. This need continues to grow as electronic transactions constitute an increasingly large share of commercial activity. Contactless cards can be an invaluable resource in providing data security and transaction integrity. While the growing use of chip-based financial cards (e.g., EMV cards) provides certain secure features over the legacy magnetic stripe cards (MSD), the majority of contactless-accepting merchants still utilize MSD cards and MSD technology. Therefore, many card issuers still choose to support both MSD cards and EMV cards.

SUMMARY

Because many card issuers still choose to support MSD cards in this country, technologies that facilitate transaction security and user authentication for these cards are desirable. In particular, it is important to enhance card security for contactless legacy magnetic stripe cards when it comes to interactions with cellphones or similar client devices. Example interactions can include activation, authentication or step-up authentication using mobile devices, cellphones and tablets.

In an example embodiment, a secure data transmission system including an MSD compliant card ("card"), a cellphone and a server are disclosed. The cellphone can receive protected data from the card and transmit the protected data to the server for further analysis or action. The card can have a processor and memory, and the memory of the card can store a master key (or derived key), transmission data and a counter value (and/or a key diversification value). The server can have a processor and memory, and the memory of the server can store the master key. The card and the server can be in data communication using the cellphone. The card can be configured to generate a diversified key using the master key, the counter value (and/or the key diversification value) and one or more cryptographic algorithms and store the diversified key in the memory of the card. The card can also encrypt the transmission data using one or more cryptographic algorithms and the diversified key to yield encrypted transmission data, and transmit the encrypted transmission data to the server using the cellphone. The server is configured to generate the diversified key based on the master key and the counter value (and/or the key diversification value), and store the diversified key in the memory of the server. The server can independently maintain the counter value (and/or the key diversification value) or it can receive it from the card along with or separate from the encrypted transmission data. The server can decrypt the encrypted transmission using the replicated diversified key and take further action, e.g., authorize an authentication step.

In one example embodiment, the key diversification value can be provided by the user as a fingerprint, numeric code or photo. The user can provide the key diversification value to the card or the cellphone. In this embodiment, the card can create the diversified key using the user provided key diversification value. The card or the cellphone can transmit the user provided diversification value to the server and the server can recreate the diversified key using the user provided diversification value.

In an example embodiment, the card can include a derived key and a cryptographic algorithm. The card can generate a cryptogram using the derived key and the cryptographic algorithm (e.g., dCVV in Visa or CVC3 in MasterCard). The card can transmit the cryptogram to the cellphone and the cellphone can transmit the cryptogram to the server. The server can validate the cryptogram and authorize a transaction if the cryptogram is validated. In this example embodiment, the derived key is specific to each card. For example, at BIN level, there can be a primary key (or Master Key). The derive key can be generated using an algorithm leveraging the primary key, a PAN, and a PAN Sequence Number.

DETAILED DESCRIPTION

Figure 1A:
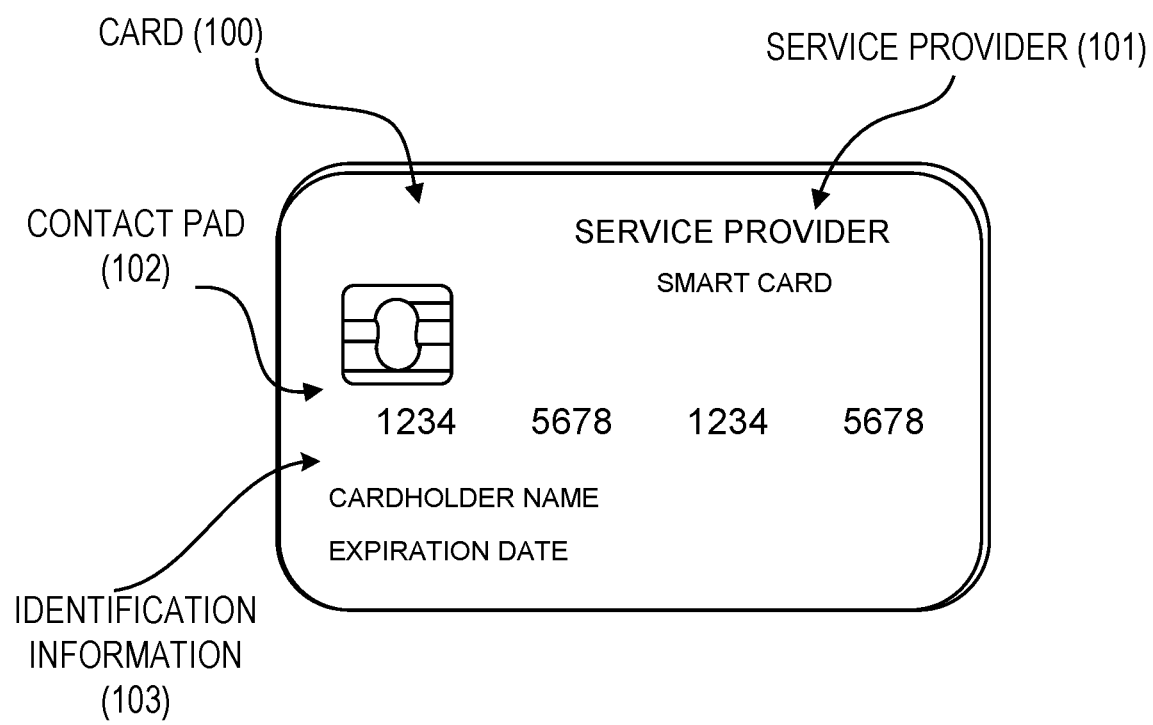
FIG. 1A illustrates a contactless card according to an example embodiment.

An objective of some embodiments of the present disclosure is to build one or more keys into a contactless legacy magnetic stripe card. The contactless card can perform authentication and numerous other functions that can otherwise require the user to carry a separate physical token in addition to the contactless card. By employing a contactless interface, contactless cards can interact with a client device (such as a mobile phone). The client device can relay any encrypted data provided by the card to a backend server, which can in turn authorize various transactions, e.g., authentication of the user.

In one example embodiment, an MSD card or a contactless legacy magnetic stripe card (hereinafter "card") can be compliant with one or more of the following standard: ISO/IEC 7810, ISO/IEC 7811, ISO/IEC 7812, ISO/IEC 7813, ISO 8583, and ISO/IEC 4909. These standards can define the physical properties of the card, including size, flexibility, location of the magnetic stripe, magnetic characteristics, and data formats.

The size of a card can be the same as the size of a payment card, credit card or a debit card. According to ID-1 of the ISO/IEC 7810 standard, the dimensions of a card can be 85.60 by 53.98 millimeters (3.37 in×2.13 in). However, a card according to these disclosures can have a different size, and it is not necessary for a card to be implemented in a payment card.

In an example embodiment, the card can include a magnetic stripe which can store data by modifying the magnetism of the iron-based magnetic particles on a band of magnetic material on the card. The magnetic stripe can be read by swiping past a magnetic reading head. In an example embodiment, there can be up to three tracks on magnetic cards known as tracks 1, 2, and 3. Point-of-sale card readers almost always read track 1, or track 2, and sometimes both, in case one track is unreadable. The minimum cardholder account information needed to complete a transaction can be present on both tracks.

In one example embodiment, track 1 can include information such as primary account number ("PAN"), name, expiration date, service code and discretionary data (e.g., Pin Verification Key Indicator (PVKI), PIN Verification Value (PVV), Card Verification Value or Card Verification Code (CVV or CVC)). In one example embodiment, track 2 can include PAN, expiration date, service code and discretionary data (e.g., same as track 1).

A card can include processing circuitry for storing and processing information. The processing circuitry can include processors, memories, error and parity/CRC checkers, data encoders, anticollision algorithms, controllers, command decoders, security primitives and tamperproofing hardware.

The storage of information can take place in a memory of the processing circuitry, which can be a read-only memory, write-once read-multiple memory or read/write memory, e.g., RAM, ROM and EEPROM. A card can include one or more of these memories which can store information including the information stored on any one of the tracks of card. The contactless card can transfer the information stored on these memories of the contactless card using the NFC technology. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory of a card can be divided into several zones, each provided with a different level of security. The card processor can keep track of which memory addresses belong to which zones and the circumstances under which each zone can be accessed. A card processor can also process information and store the information onto the memory. In an example embodiment, a card memory can be divided into four zones: a secret zone, a confidential zone, a usage zone, and a public zone.

A secret zone can be used for storage of information which can be used only by the processor itself, e.g., passwords, cryptographic keys. The information stored in this zone is not readable outside of the card. In an embodiment, the secret zone can be implemented with a separate processor that is capable of performing cryptographic functions. Cryptographic keys can be passed into the secret zone or can be generated in the secret zone, and in either case the keys can be stored in the secret zone and used to support cryptographic services. If necessary, cryptographic keys can be exported from the secret zone.

In an example embodiment, the card can be a JavaCard which can include one or more applets. The applets can be firewalled, and data can be allocated to the applet for storage. The data can be stored transactionally in an EEPROM flash memory, e.g., if the write isn't complete when the power is removed, the contents remain the same as before.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified. A usage zone could be used for storage of information which can be periodically updated or modified. Depending on the sensitivity of the data, a password can be implemented for this zone. The usage zone can have both read and write access protected by a password. A public zone can be used for keeping nonsensitive information, such as the card issuer's name and address. The public zone can have read-only access, without a password.

In an example embodiment, the card can store one or more key diversification values. The card can use these key diversification values to create a diversified key. For example, the card can store a counter value. The counter value can be derived from a counter module, and the counter module can increment the counter value each time the card interacts with the cellphone or server. As another example, the card can store a plurality of fingerprints and store a diversification value in association with each fingerprint. The card can include a fingerprint reader, and when the user scans a finger at the fingerprint reader, the card can determine if any of the stored fingerprints is scanned at the fingerprint reader. The card can also choose the diversification value that is associated with the scanned fingerprint. The chosen diversification value can be used to generate the diversified key. As yet another example, the card can store a set of random diversification values. As yet another example, the card can receive a diversification value from an input device installed on the card (e.g., keypad or fingerprint reader) or through a contactless transmission from the cellphone.

Some cards can require physical contact with a client device (or reader/writer, reader, or scanner) to provide the information stored on the card to the client device or to write information on the card. Other cards can be contactless, i.e., the cards can wirelessly communicate with the client device. A contactless card can be a credit card including a magnetic tape or a radio-frequency identification ("RFID") tag. Some contactless cards can include both the magnetic tape and the RFID tag. Some cards can be compatible with wireless communication technologies such as NFC, Bluetooth, Wi-Fi, etc.

A terminal can communicate with a contact card by establishing electrical contact between the card and the terminal. As such, a contact card can have a contact area comprising several contact pads. The area can be approximately 1 square centimeter (0.16 sq in). Establishing contact between the pads and the terminal can be achieved by inserting (or dipping) the contact card into the terminal. Using the electrical connection, the terminal can transmit signals to the card, and in response, the card can transmit its information to the terminal. Generally, contact cards do not contain a battery. However, in some embodiments, contact cards can include batteries.

A client device can communicate with a contactless card if the contactless card is held in proximity to the client device. The client device can read the contactless card over a short distance using near-field communication ("NFC") technology, which uses radio frequency induction. A contactless card can include an inductor to capture some of the incident radio-frequency interrogation signal transmitted by the terminal, rectify it, and use it to power the card's processing circuitry. As such, contactless cards can function without an internal power source. However, in some embodiments, contactless cards can include an internal power source.

FIG. 1A illustrates a contactless card 100 according to an example embodiment. In this embodiment, the card 100 can be a payment card issued by a service provider 101 which can be displayed on the front or back of the card 100. The size of the card 100 can be compliant with ID-1 of the ISO/IEC 7810 standard, i.e., 85.60 by 53.98 millimeters. The card 100 can include a contact pad 102 for establishing contact with a contact terminal. The card 100 can also include processing circuitry, antenna and other components not displayed in FIG. 1A. These components can be located behind the contact pad 102. The card 100 can also include various identification information 103 displayed on front or back of the card. The card 100 can also include a magnetic stripe or tape, which can be located on the back of the card.

In an example embodiment, the card is provided with a near field communication ("NFC") tag. In some embodiments, the NFC tag can include processing circuitry for storing and processing information that modulates and demodulates a radio-frequency signal (usually received from a client device, reader/writer or scanner). The NFC tag can also include an anti-collision algorithm, authentication and cryptographic mechanism, RF interface circuit, and RF antenna operating at 13.56 MHz. The RF antenna can receive and transmit a signal. Additionally, an RFID tag can include a power source or means for collecting DC power from the incident terminal signal. These means can include modulators, voltage regulators, resets, and connections to an antenna. The antenna can be an electric dipole antenna or a coil antenna.

There can be several kinds of NFC tags, e.g., active tags, battery-assisted passive tags and passive tags. An active tag can be electrically coupled to a power source, such as a battery, which can power the integrated circuit. As a result, an active tag can periodically transmit as a signal the information stored on the tag. A battery-assisted passive tag can have an activateable power source electrically coupled to it, and the power source can be activated when the tag is exposed to a signal from a terminal. A passive tag is not powered by a power source. Rather, the tag is energized by the radio energy transmitted to the tag by the terminal.

In an example embodiment of a passive NFC tag, the tag relies on a signal from the client device to power up. The tag can include modulators, voltage regulators, resets, and connections to an antenna. The antenna can be an electric dipole antenna or a coil antenna, and the processing circuitry of the tag can be connected to the antenna. The type of the antenna can be determined based on the frequency band used by the tag. Typically, an electric dipole antenna is used with an ultra-high frequency tag, but high frequency tags use a coil antenna. For example, the antennas for an NFC tag can be a simple dipole if the tag uses 915-MHz frequency, but the antenna can be a complex coiled shape if the tag uses 13.56-MHz frequency. The antenna captures and transmits signals to and from the terminal. The coupling from the terminal to the tag provides both the transmission data and the power to operate the passive NFC tag.

Figure 1B:
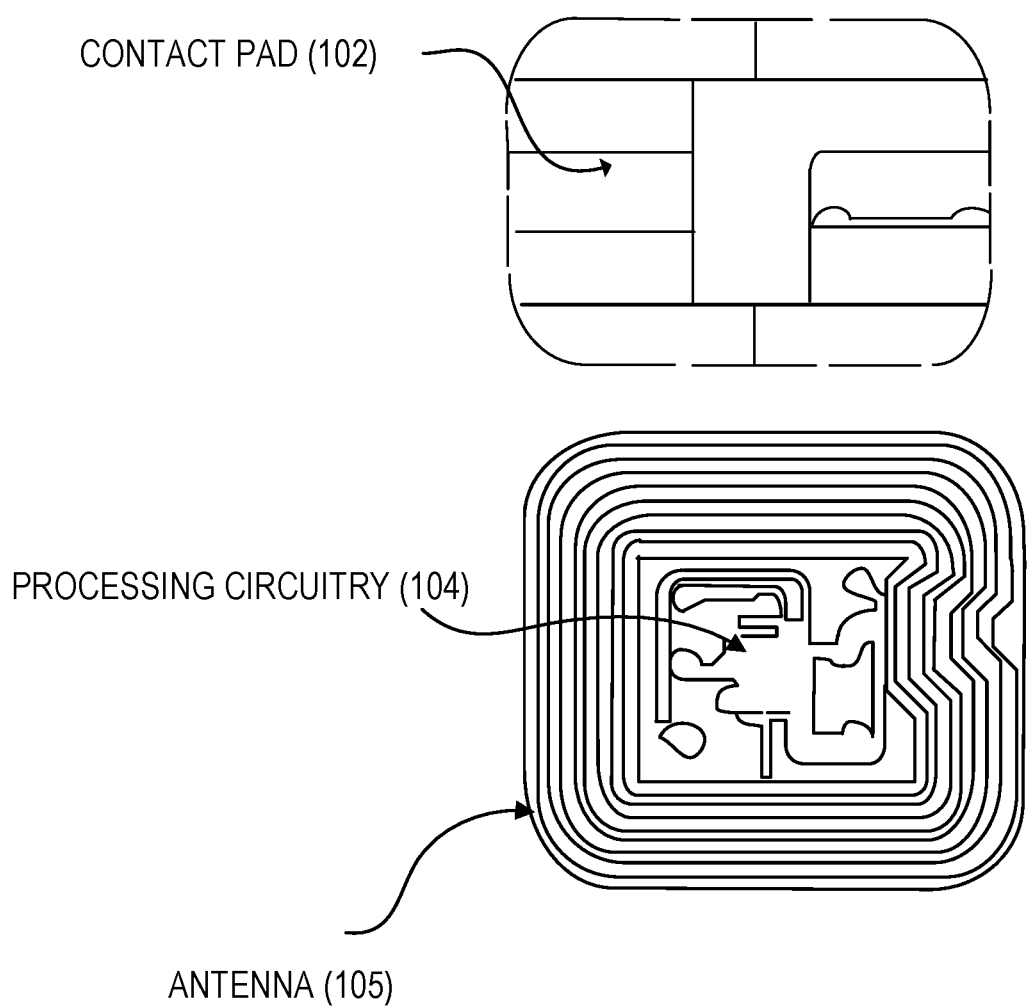
FIG. 1B illustrates an exemplary contact pad including an NFC tag behind the contact pad.

FIG. 1B illustrates an exemplary contact pad 102 including an NFC tag behind the contact pad 102. In this example embodiment, the contact pad 102 can include several gold-plated pads. Behind the contact pad 102, there can be processing circuitry 104 and an NFC tag. The NFC tag can include an antenna 105. In this example embodiment, the processing circuitry 104 is part of the NFC tag.

In some embodiments, the antenna of the NFC tag of the card can be placed within the card and around the contact pad 102. In other embodiments, the NFC tag of the card can include several antennas. For example, in addition to antenna 105, the card can include an antenna which extends around the contact pad 102 and throughout the card 100.

Other combinations are also possible. In some embodiments, the antenna can be external to the contact pad and the processing circuitry. In some other embodiments, there can be an antenna integral with the processing circuitry and the antenna can be used with an external booster coil.

In an example embodiment, the coil of a card can act as the secondary of an air core transformer. The terminal can communicate with the card by cutting power or amplitude modulation. The card can infer the data transmitted from the terminal using the gaps in the card's power connection, which is functionally maintained through capacitors. The card can communicate back by switching a load on the card's coil or load modulation. Load modulation can be detected in the terminal's coil through interference.

In an example embodiment, the card can include a keypad and/or fingerprint reader. Using the keypad and/or fingerprint reader, the user can provide input to the card. For example, using the keypad, the user can provide a code to the card, which the card can use as a key diversification value. Similarly, the user can scan and store the user's fingerprint on the card. The card can associate each fingerprint scanned and stored on the card with an encryption algorithm (or a key diversification value). By scanning the user's fingerprint, the user can specify which encryption code the card can use.

A client device can be a cellphone, a mobile phone or a tablet. A client device can read information from a card and write information onto the card. In some embodiments, the client device can pass information from the card to a host computer and write information from the host computer into the card. In some embodiments, the host computer can be the client device. The client device can provide power to the card and link the card's hardware interface to the host computer. Since the card's processor can control the actual flow of information into and out of the card's memories, the client device can operate with only minimal processing capabilities for sending the information to the host computer.

In some embodiments, the client device can include a processor and a transceiver. The transceiver can send and receive data from the card using the NFC protocol. The processor of the client device can decode any data received from the card. The client device can also update, delete or modify the information stored on the card.

A client device can write data on the card by passing the data to the processor of the card. The processor can process the data and store it in the card's memory. A client device can have a two-way communication with a card as described in ISO 14443. The card can include an NFC tag. The two-way communication can be digitally encoded. There can be several frequency ranges, and several proprietary formats for the two-way communication. The 13.56 Mhz frequency range (NFC) is dominated by ISO 14443 compatible cards.

A client device and a card can exchange messages, which can include commands or data. For example, a client device can send a command message to the card, the card can process the command message in its processor and the card can send back a response message to the client device. Each of the command message and the response message can include data. A message can include TLV (Type, Length and Value) data and a command such as STORE DATA command which prompts storage of the data included in the message in the card.

Figure 2:
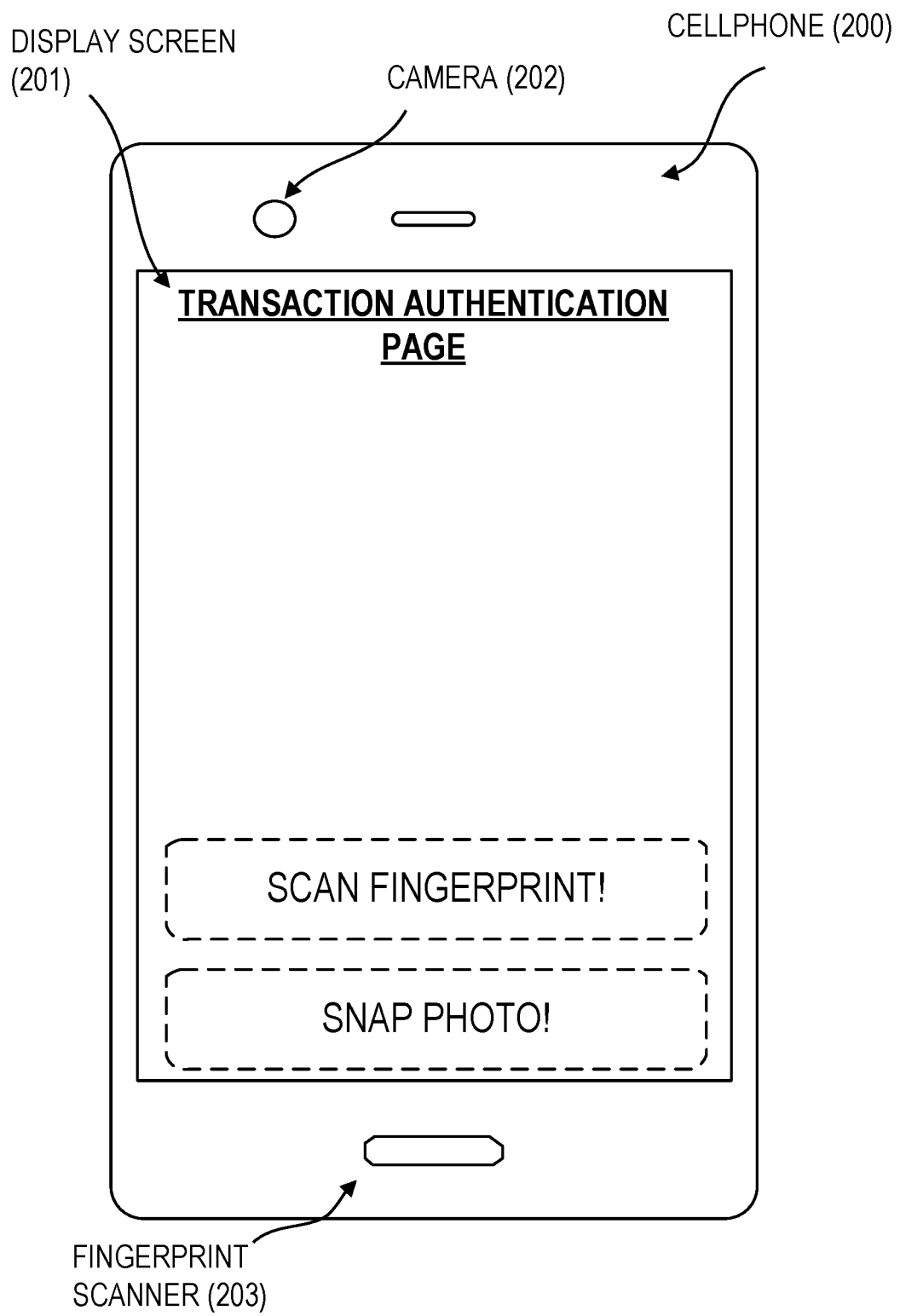
FIG. 2 illustrates a cellphone according to an example embodiment.

FIG. 2 illustrates a cellphone 200 according to an example embodiment. In this example embodiment, the cellphone 200 can include a display screen 201, camera 202 and fingerprint scanner 203. The display screen 201 can be any type of display screen, e.g., a touchpad LCD display screen. Using the touchscreen 201, for example, a customer can enter information into the cellphone 200. As another example, by pressing a graphical user interface button, the user can command the camera 202 to take a photo of the user. The camera can store the photo and/or transmit the photo to a backend server. As yet another example, the user can command the cellphone 200 to scan the user's fingerprint using the fingerprint scanner 203. The cellphone 200 can store the fingerprint and/or transmit the fingerprint to the card or backend server.

In an example embodiment, the cellphone can be an NFC compatible cellphone, which can include antennas for sending and receiving signals, a transceiver, and a processor to decode data. For a passive NFC tag, the cellphone can transmit an energy field that can wake up the tag (or card) and power its chip, enabling it to transmit or store data. In turn, the tag converts the radio signal into usable power, and responds to the cellphone in the form of a radio signal. The signal can include the tag's identity and other information. Once the cellphone receives the response, the cellphone converts the response and extracts any information included in the radio signal. The information collected from the tag is then transferred through a communications interface to a backend server, where the data can be stored in a database or analyzed by the server. The cellphone can also update, delete or modify the information stored on the card.

In the example embodiment of FIG. 2, the cellphone 200 is provided with one or more antennas (not displayed), which enable the device to read information from a contactless card and write information on the contactless card.

In these disclosures, the terms client device, cellphone, reader/writer, scanner and terminal have been used interchangeably, and they all refer to a device which can scan a card and/or write information on the card. In some embodiments, the cellphone can be connected to a backend server. In other embodiments, the cellphone can be integrated in the backend server.

In an example embodiment, the cellphone can include one or more of the following: a fingerprint reader, a camera, and an application for receiving input from the user (e.g., a PIN code, key diversification value, or identification number). The cellphone can transmit any input provided by the user to a backend server and the card for, e.g., key diversification purposes. For example, the backend server can store a plurality of fingerprints for the user and the server can associate an encryption algorithm with each one of the fingerprints. When scanning the card at the cellphone, the cellphone can also receive the user's fingerprint (or other information, e.g., a photo or PIN number) and transmit this information to the backend server. Using this information, the backend server can determine which encryption algorithm was used in the key diversification process.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data an attacker has which was processed with the same key, the greater the likelihood that the attacker may discover the value of the key. A key used frequently may be comprised in a variety of different attacks.

Moreover, each time a symmetric cryptographic algorithm is executed, it can reveal information, such as side-channel data, about the key used during the symmetric cryptographic operation. Side-channel data can include minute power fluctuations which occur as the cryptographic algorithm executes while using the key. Sufficient measurements can be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Figure 3:
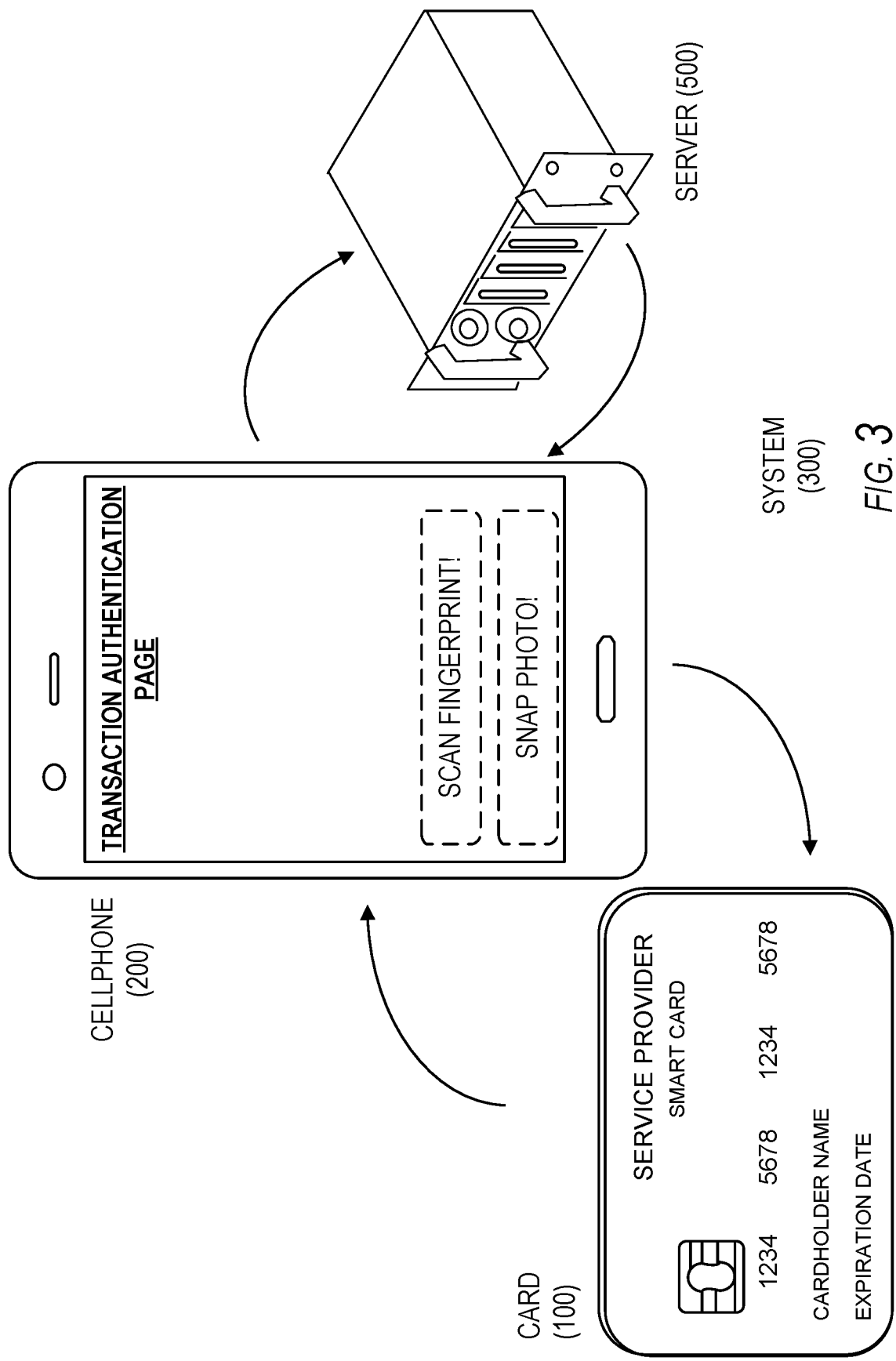
FIG. 3 illustrates a data transmission system according to an example embodiment.

FIG. 3 illustrates a data transmission system according to an example embodiment. System 300 can include a card 100 and a cellphone 200 in communication, for example via a network, with one or more servers 500. The system 300 can be configured to implement a key diversification algorithm. For example, a sender (e.g., card) and recipient (e.g., backend server) can desire to exchange data (e.g., sensitive data) via the cellphone 200.

In some examples, the card 100 and the server 500 can be provisioned with the same master symmetric key. The symmetric key can be kept secret from all parties other than the card 100 and the server 500 involved in exchanging the secure data. It is further understood that part of the data exchanged between the card 100 and server 500 comprises at least a portion of data which may be referred to as sensitive data, counter value, or other types of data (e.g., a key diversification value). The counter value may comprise a number that changes each time data is exchanged between the card 100 and the server 500. In this disclosure, the counter value and the key diversification value can be used as referring to the same value or a different value, both of which are within the scope of this disclosure.

Figure 4:
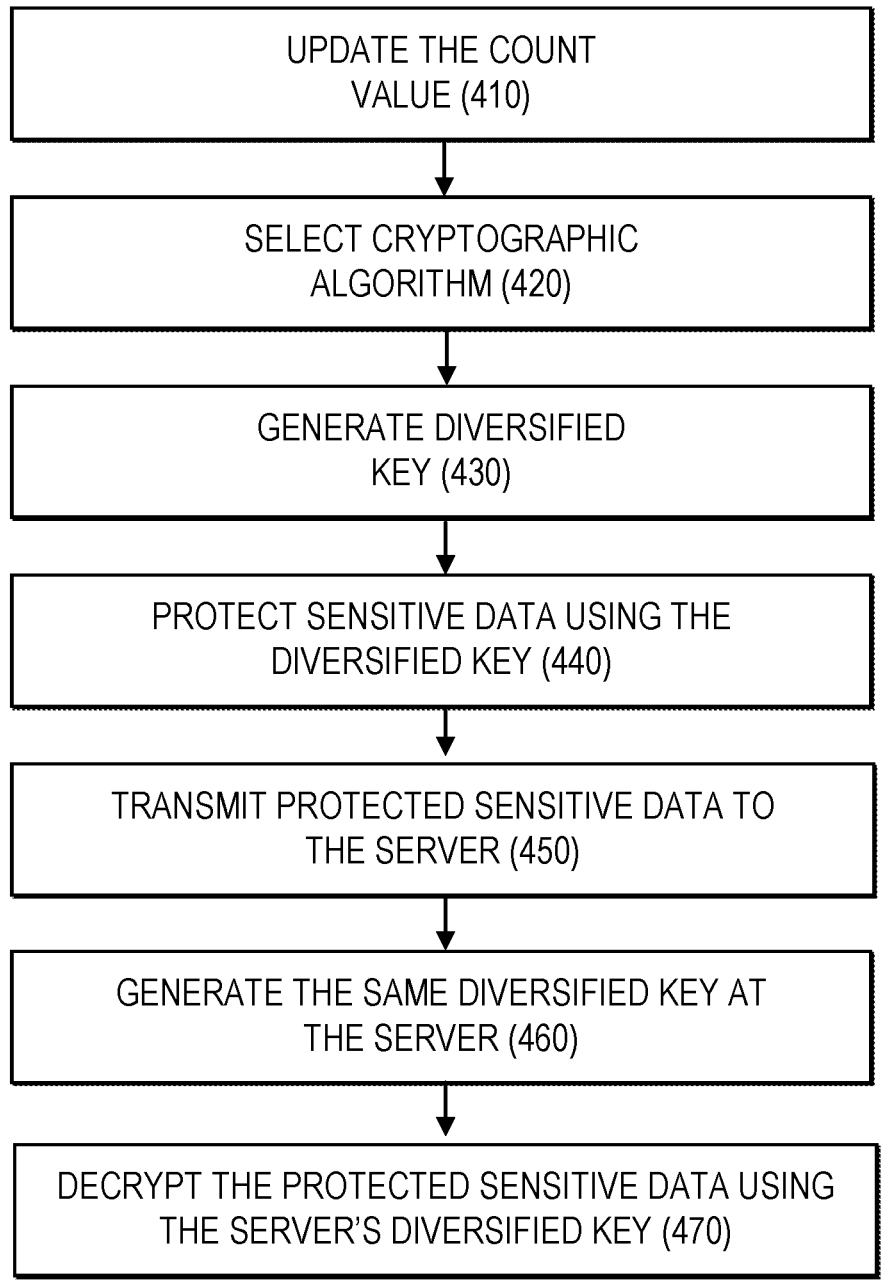
FIG. 4 illustrates a flow chart for encryption and transmission of sensitive data from the card to the server through the cellphone.

FIG. 4 illustrates a flow chart for encryption and transmission of sensitive data from the card 100 to the server 500 through the cellphone 200. At step 410, when the card 100 is preparing to process the sensitive data with symmetric cryptographic operation, the card 100 can update a counter. Both the card 100 and the server 500 can store a value representing the counter. This value can be updated each time the card 100 and the server 500 interact.

At step 420, the card 100 can select an appropriate symmetric cryptographic algorithm, which can include at least one of a symmetric encryption algorithm, HMAC algorithm, and a CMAC algorithm. The algorithm selection of the card 100 can be based on an input, which can be provided by data stored on the card 100 (e.g., counter value), data received from the user (e.g., input pad of the card 100), or data provided by the cellphone 200 or server 500.

In some examples, the symmetric algorithm can comprise any symmetric cryptographic algorithm used to generate a desired length diversified symmetric key. Non-limiting examples of the symmetric algorithm can include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which can be combined as needed to produce sufficient length keys.

At step 430, the card 100 can generate a diversified key. For example, the diversified key can be generated by encrypting the counter value (i.e., key diversification value) with the selected symmetric encryption algorithm using the master symmetric key, thereby creating a diversified symmetric key. As another example, the master key and the key diversification value can be provided as an input to an encryption algorithm and the output can be the diversified (symmetric) key. The diversified symmetric key can be used to process the sensitive data before transmitting the result to the server 500 through the cellphone 200.

At step 440, the sensitive data can be protected using one or more cryptographic algorithms and one or more diversified keys. The diversified key, which was created in step 430, can be used with one or more cryptographic algorithms to protect the sensitive data. In some examples, a plurality of cryptographic operations may be performed using the diversified symmetric keys prior to transmittal of the protected data. For example, the data can be processed by a MAC using a first diversified session key, and the resulting output can be encrypted using a second diversified session key producing the protected data. The cryptographic algorithms can be selected using an algorithm selection technique.

In one example embodiment, the sensitive data can include data similar to data stored in track 1 or track 2 of a magnetic stripe card. In another example embodiment, the sensitive data can include the counter value. In yet another example embodiment, the sensitive data can include other data provided by the card 100 or cellphone 200, e.g., a number inputted by a keypad of the card 100 or a photo captured by the cellphone 200.

At step 450, the protected data (i.e., the sensitive data that was protected in step 430) can be transmitted to the cellphone 200 and the cellphone 200 can transmit the protected data to the server 500. At step 460, the server 500 can perform the same symmetric encryption using the counter value as input to the encryption and the master symmetric key as the key for the encryption. The output of the encryption can be the same diversified symmetric key value that was created by the card 100. For example, the server 500 can replicate the diversified key created at the card 100 and using the replicated diversified key, decrypt the protected data. As another example, the server 500 can independently create its own copies of the first and second diversified session keys using the counter value. Then, the server 500 can decrypt the protected data using the second diversified session key to reveal the output of the MAC created by the card. The server 500 can then process the resultant data through the MAC operation using the first diversified session key.

In one embodiment, at step 470, the server 500 can use the diversified key to decrypt the protected sensitive data. In another embodiment, at step 470, the server 500 can use the diversified keys with one or more cryptographic algorithms to validate the protected data, and at step 480, the original data may be validated. For example, if the output of the MAC operation matches the MAC output revealed by decryption, then the data may be deemed valid.

The next time sensitive data needs to be sent from the card 100 to the server 500 via the cellphone 200, a different counter value can be selected producing a different diversified symmetric key. By processing the counter value with the master symmetric key and same symmetric cryptographic algorithm, both the card 100 and the server 500 can independently produce the same diversified symmetric key. This diversified symmetric key, not the master symmetric key, is used to protect the sensitive data.

Both the card 100 and the server 500 each initially possess the shared master symmetric key. The shared master symmetric key is not used to encrypt the original sensitive data. Because the diversified symmetric key is independently created by both the card 100 and the server 500, it is never transmitted between the two parties. Thus, an attacker cannot intercept the diversified symmetric key and the attacker never sees any data which was processed with the master symmetric key. As a result, reduced side-channel data about the master symmetric key is revealed. Moreover, the operation of the card 100 and the server 500 can be governed by symmetric requirements for how often to create a new diversification value, and therefore a new diversified symmetric key. In an embodiment, a new diversification value and therefore a new diversified symmetric key can be created for every exchange between the card 100 and the server 500.

In some examples, the key diversification value can comprise the counter value. Other non-limiting examples of the key diversification value include: a random nonce generated each time a new diversified key is needed, the random nonce sent from the card 100 to the server 500; the full value of a counter value sent from the card 100 to the server 500; a portion of a counter value sent from the card 100 to the server 500; a counter independently maintained by the card 100 and the server 500 but not sent between the two devices; a one-time-passcode exchanged between the card 100 and the server 500; and a cryptographic hash of the sensitive data. In some examples, one or more portions of the key diversification value can be used by the parties to create multiple diversified keys. For example, a counter may be used as the key diversification value. Further, a combination of one or more of the exemplary key diversification values described above can be used.

In another example, a portion of the counter can be used as the key diversification value. If multiple master key values are shared between the parties, the multiple diversified key values can be obtained by the systems and processes described herein. A new diversification value, and therefore a new diversified symmetric key, can be created as often as needed. In the most secure case, a new diversification value can be created for each exchange of sensitive data between the card 100 and the server 500. In effect, this can create a one-time use key, such as a single-use session key.

In one example embodiment, the key diversification value can be the counter value. However, in other example embodiments, in addition to or instead of the counter value, the key diversification value can be determined based on an input provided by the user.

For example, the user can use the keypad on a screen of a cellphone to specify a numeric code. The cellphone can transmit this numeric code to the card and the server as the key diversification value. As another example, the user can use the keypad on the card to specify a numeric code. The card can use this numeric code as the key diversification value. The card can also transmit this diversification value to the cellphone which can in turn transmit this code to the server. The numeric code can be encrypted when it is transmitted to the cellphone. As another example, the user can provide a fingerprint on a fingerprint reader of the card or cellphone. Using the fingerprint, the card or the cellphone can determine a key diversification value. For example, if the user sets up the fingerprint on the cellphone, at the time of setup, for each finger the user scans, the user specifies an alphanumeric value. The cellphone can store each fingerprint and the alphanumeric value in an association. Subsequently, when the user desires to authorize a transaction, the user can scan the user's finger and tap the card on the cellphone. The cellphone can transmit the key diversification value associated with the fingerprint to the card and the server. Both the card and the server can use the key diversification value to create the diversified key.

As another example, the user can scan the user's finger on the card. In this example, when the user scans the user's finger, using the keypad of the card, the user can specify a key diversification value associated with each fingerprint provided by the user. Subsequently, when the user scans the user's finger at the card, the card uses the associated key diversification value in the encryption operation. The card can transmit the encrypted data and the key diversification value to the cellphone, which can in turn transmit the key diversification value to the server. In one example, at the time of setup, the user can scan the user's fingers on the card (or the cellphone). Once the setup is done, the user can scan the card at the cellphone. The card (or the cellphone) can transmit the association of fingerprints and the key diversification values to the cellphone (or the card). In this example, when the user desires to authorize a transaction, the user can scan the user's fingerprint at the card and the cellphone, and there will be no need for transmission of the diversification value between the cellphone and the card.

In one example embodiment, the card and the server can use fingerprint associations for selection of the encryption algorithm. For example, a user can define a relationship between each fingerprint and an encryption algorithm. When the user scans the user's finger at the cellphone (or the card), either the cellphone or the card can determine a defined encryption algorithm for the scanned fingerprint.

In one example embodiment, the cellphone is configured to take a photo of the user and transmit the photo of the user to the server. The server can determine a key diversification value and/or an encryption algorithm based on the photo. In one embodiment, when the server receives the user's photo, as a threshold matter, the server can perform a facial recognition function to determine whether the photo belongs to the user of the card. If the server determines that the photo belongs to the user, the server can determine a facial expression of the user in the photo. For example, if the user smiles, the server can associate the user's facial expression with a first diversification value and/or a first encryption algorithm. However, if the user closes his or her eyes, the server can associate the user's facial expression with a second diversification value and/or a second decryption algorithm. Subsequently, the server can transmit the diversification value and/or decryption algorithm associated with the facial expression to the cellphone and the cellphone can transmit the diversification value and/or decryption algorithm to the card. The card can generate a diversified key using the associated diversification value and/or select the associated decryption algorithm for encryption of the sensitive data. In another embodiment, the server can determine a color of an outfit of the user and determine the diversification value and/or encryption algorithm based on the color of the outfit.

In one example embodiment, the cellphone can transmit the user's photo to the server and the server can transmit a hash of the photo to the cellphone. The cellphone can transmit the hash of the photo to the card. The card can use the hash of the photo as the diversification value.

In one example embodiment, the diversification value can be selected based on a fingerprint input provided by the user and the encryption algorithm can be selected based on a photo submitted by the cellphone to the server. For example, using the fingerprint, the cellphone can determine a diversification value and transmit the value to both the card and the server. Additionally, using the photo, the server can determine an encryption algorithm. The server can transmit the selected encryption algorithm to the cellphone and the cellphone can transmit the selected encryption algorithm to the card.

In one example embodiment, the diversification value can be a combination of multiple diversification values. For example, the diversification value can be a cryptographic combination of a diversification value derived using a fingerprint and a diversification value derived using a photo of the user.

Figure 5:
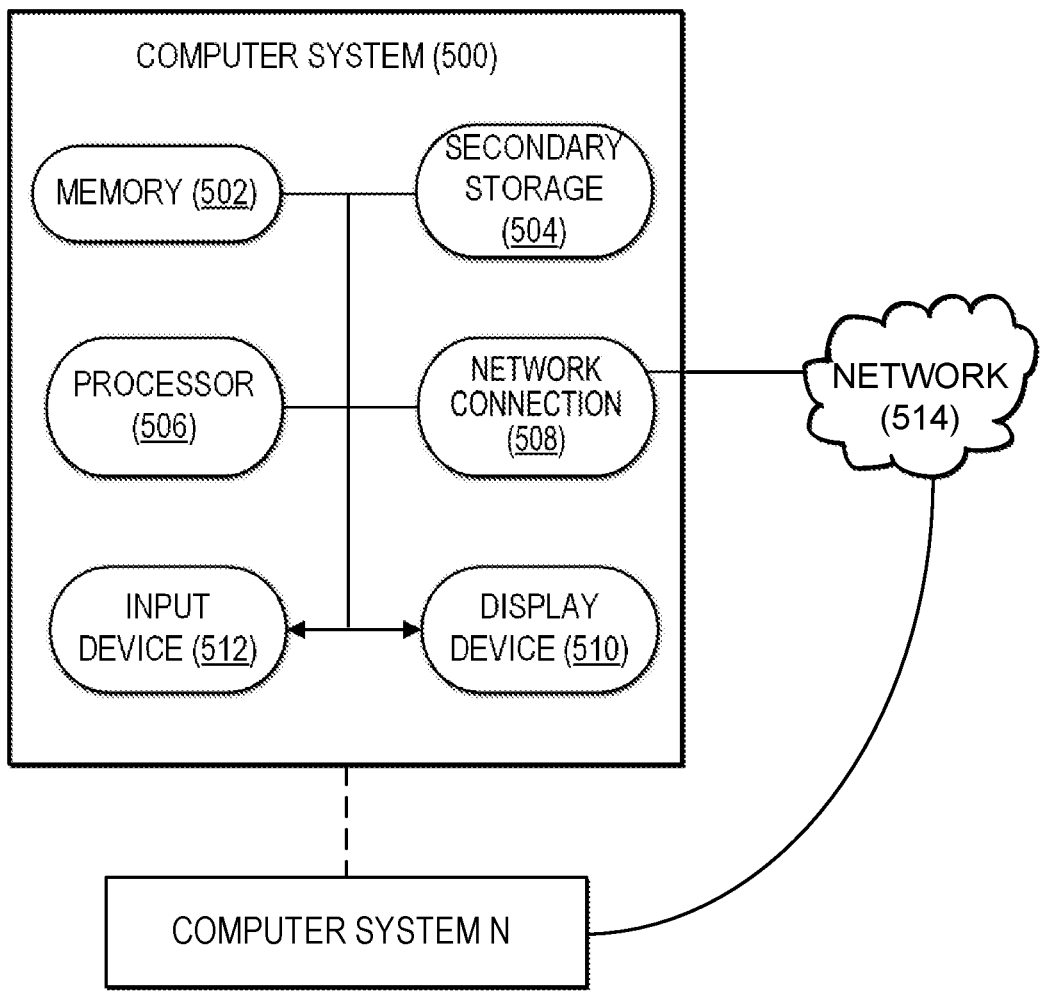
FIG. 5 illustrates exemplary hardware components for a server.

FIG. 5 illustrates exemplary hardware components of a server. A computer system 500, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 500, may run an application (or software) and perform the steps and functionalities described above. Computer system 500 may connect to a network 514, e.g., Internet, or other network, to receive inquiries, obtain data, and transmit information and incentives as described above.

The computer system 500 typically includes a memory 502, a secondary storage device 504, and a processor 506. The computer system 500 may also include a plurality of processors 506 and be configured as a plurality of, e.g., bladed servers, or other known server configurations. The computer system 500 may also include a network connection device 508, a display device 510, and an input device 512.

The memory 502 may include RAM or similar types of memory, and it may store one or more applications for execution by processor 506. Secondary storage device 504 may include a hard disk drive, floppy disk drive, CD-ROM drive, or other types of non-volatile data storage. Processor 506 executes the application(s), such as those described herein, which are stored in memory 502 or secondary storage 504, or received from the Internet or other network 514. The processing by processor 506 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 500 may store one or more database structures in the secondary storage 504, for example, for storing and maintaining the information necessary to perform the above-described functions. Alternatively, such information may be in storage devices separate from these components.

Also, as noted, processor 506 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 500.

The input device 512 may include any device for entering information into the computer system 500, such as a touchscreen, keyboard, mouse, cursor-control device, microphone, digital camera, video recorder or camcorder. The input and output device 512 may be used to enter information into GUIs during performance of the methods described above. The display device 510 may include any type of device for presenting visual information such as, for example, a computer monitor or flat-screen display (or mobile device screen). The display device 510 may display the GUIs and/or output from sub-system components (or software).

Examples of the computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 500 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 500, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A data transmission system comprising:
   a card having a processor and memory, the memory of the card containing a master key, transmission data and a counter value, wherein the card is an MSD compliant card;
   a server having a processor and memory, the memory of the server containing the master key and the counter value;
   a cellphone wherein the server is in data communication with the card through the cellphone;
   wherein the cellphone is configured to:
      receive an input from a user and, based on the input, derive a key diversification value;
      transmit the key diversification value to the card;
      receive encrypted transmission data from the card; and
      transmit the encrypted transmission data and the key diversification value to the server;
   wherein the card is configured to:
      generate a diversified key using the master key, the counter value, the key diversification value and one or more cryptographic algorithms;
      encrypt the transmission data using one or more cryptographic algorithms and the diversified key to yield the encrypted transmission data, and
      transmit the encrypted transmission data to the cellphone; and
   wherein the server is configured to:
      receive the encrypted transmission and the key diversification value from the cellphone;
      generate the diversified key based on the master key, the counter value and the key diversification value; and
      decrypt the encrypted transmission data using one or more cryptographic algorithms and the diversified key; and
      transmit a communication to a second server to authenticate a transaction.

2. The data transmission system of claim 1, wherein the card is a contactless card in compliance with the following standards: ISO/IEC 7810, ISO/IEC 7811, ISO/IEC 7812, ISO/IEC 7813, ISO 8583, and ISO/IEC 4909.

3. The data transmission system of claim 1, wherein the transmission data includes an account number.

4. The data transmission system of claim 1, wherein the input is an alphanumeric code provided by the user through a touchscreen of the cellphone.

5. The data transmission system of claim 1, wherein the input is a fingerprint scanned at the cellphone.

6. The data transmission system of claim 5, wherein the cellphone stores a plurality of key diversification values in association with a plurality of fingerprints.

7. The data transmission system of claim 6, wherein the cellphone is configured to transmit to the card and the server the key diversification value associated with the fingerprint scanned at the cellphone.

8. The data transmission system of claim 1, wherein the input is a photo of the user.

9. The data transmission system of claim 8, wherein the cellphone is configured to transmit the photo to the server.

10. The data transmission system of claim 9, wherein the server is configured to conduct a facial recognition technique to match the photo to a photo of the user stored in the server.

11. The data transmission system of claim 10, wherein the server is configured to generate the key diversification value based on the photo.

12. The data transmission system of claim 11, wherein the server is configured to transmit the key diversification value to the cellphone.

13. A data transmission system comprising:
a card having a processor and memory, the memory of the card containing a master key, transmission data and a counter value, wherein the card is an MSD compliant card;
a server having a processor and memory, the memory of the server containing the master key and the counter value;
a cellphone wherein the server is in data communication with the card through the cellphone;
wherein the cellphone is configured to:
receive a first input from a user and, based on the first input, derive a key diversification value;
receive a second input from the user and, based on the second input, derive an algorithm selection value;
transmit the key diversification value and the algorithm selection value to the card;
receive encrypted transmission data from the card; and
transmit the encrypted transmission data, the key diversification value and the algorithm selection value to the server;
wherein the card is configured to:
generate a diversified key using the master key, the counter value, the key diversification value and a cryptographic algorithm selected using the algorithm selection value;
encrypt the transmission data using the cryptographic algorithm and the diversified key to yield the encrypted transmission data; and
transmit the encrypted transmission data to the cellphone; and
wherein the server is configured to:
receive the encrypted transmission, the key diversification value and the algorithm selection value from the cellphone;
generate the diversified key based on the master key, the counter value and the key diversification value using the cryptographic algorithm; and
decrypt the encrypted transmission data using the cryptographic algorithm and the diversified key; and
transmit a communication to a second server to authenticate a transaction.

14. The data transmission system of claim 13, wherein the card is a contactless card in compliance with the following standards: ISO/IEC 7810, ISO/IEC 7811, ISO/IEC 7812, ISO/IEC 7813, ISO 8583, and ISO/IEC 4909.

15. The data transmission system of claim 13, wherein the first input is a fingerprint scanned at the cellphone and the second input is an alphanumeric value entered on a touchscreen of the cellphone.

16. The data transmission system of claim 15, wherein the cellphone stores a plurality of key diversification values in association with a plurality of fingerprints.

17. The data transmission system of claim 16, wherein the cellphone is configured to transmit to the card and the server:
the key diversification value associated with the fingerprint scanned at the cellphone; and
the alphanumeric value as the algorithm selection value.

18. The data transmission system of claim 13, wherein the first input is a photo of the user.

19. The data transmission system of claim 18, wherein the cellphone is configured to transmit the photo to the server.

20. The data transmission system of claim 19, wherein the server is configured to generate the key diversification value based on the photo.

* * * * *